US010299300B1

(12) United States Patent
Young

(10) Patent No.: US 10,299,300 B1
(45) Date of Patent: May 21, 2019

(54) SECURE SYSTEMS AND METHODS FOR ESTABLISHING WIRELESS AUDIO SHARING CONNECTION

(71) Applicant: Bose Corporation, Framingham, MA (US)

(72) Inventor: Douglas Warren Young, Arlington, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 15/981,549

(22) Filed: May 16, 2018

(51) Int. Cl.
| | | |
|---|---|---|
| *H04R 3/12* | (2006.01) |
| *H04W 4/80* | (2018.01) |
| *H04W 8/00* | (2009.01) |
| *H04W 76/11* | (2018.01) |

(52) U.S. Cl.
CPC .............. *H04W 76/11* (2018.02); *H04R 3/12* (2013.01); *H04W 4/80* (2018.02); *H04W 8/005* (2013.01); *H04R 2420/07* (2013.01)

(58) Field of Classification Search
CPC ....... H04W 76/11; H04W 4/80; H04W 8/005; H04R 3/12; H04R 2420/07
See application file for complete search history.

(56) References Cited

U.S. PATENT DOCUMENTS

| | | | |
|---|---|---|---|
| 7,742,740 B2 | 6/2010 | Goldberg et al. |
| 7,865,137 B2 | 1/2011 | Goldberg et al. |
| 7,916,877 B2 | 3/2011 | Goldberg et al. |
| 7,917,082 B2 | 3/2011 | Goldberg et al. |
| 8,023,663 B2 | 9/2011 | Goldberg |
| 8,170,486 B2 | 5/2012 | Olofsson |
| 8,391,792 B2 | 3/2013 | Glezerman et al. |

(Continued)

FOREIGN PATENT DOCUMENTS

GB          2382952 A       6/2003

OTHER PUBLICATIONS

Argenox; A BLE Advertising Primer; Argenox Technologies LLC; 2016; Website available at: http://www.argenox.com/a-ble-advertising-primer/.

(Continued)

*Primary Examiner* — Nguyen T Vo
(74) *Attorney, Agent, or Firm* — Bond, Schoeneck & King, PLLC

(57) ABSTRACT

A system and method for tethering wireless audio devices. The method includes establishing a first wireless connection between an intermediary device and a primary audio device. A random resolvable address is received by the intermediary device from a secondary audio device. The random resolvable address is transmitted to the primary audio device via the first wireless connection. An instruction is transmitted to the primary audio device to analyze broadcasted data from nearby audio devices for a matching audio device having broadcasted data corresponding to the random resolvable address, and to initiate a second wireless connection with the matching audio device. Audio data is transmitted to the primary audio device via the first wireless connection for streaming the audio data from the primary audio device to the secondary audio device, identified to the primary audio device as the matching audio device, via the second wireless connection.

20 Claims, 4 Drawing Sheets

(56) References Cited

U.S. PATENT DOCUMENTS

| | | |
|---|---|---|
| 8,433,243 B2 | 4/2013 | Sharma |
| 8,706,038 B2 | 4/2014 | Sharma |
| 8,768,252 B2 | 7/2014 | Watson et al. |
| 8,923,747 B2 | 12/2014 | Tan et al. |
| 9,191,988 B2 | 11/2015 | Newham |
| 9,544,689 B2 | 1/2017 | Fisher et al. |
| 9,820,323 B1* | 11/2017 | Young .................. H04W 76/15 |
| 2009/0154739 A1 | 6/2009 | Zellner |
| 2009/0238375 A1 | 9/2009 | Pilati et al. |
| 2010/0284389 A1 | 11/2010 | Ramsay et al. |
| 2012/0087503 A1 | 4/2012 | Watson et al. |
| 2013/0279715 A1* | 10/2013 | Tan ................. H04M 1/274516 |
| | | 381/77 |
| 2016/0095047 A1 | 3/2016 | Lee et al. |
| 2017/0083284 A1 | 3/2017 | Fisher et al. |

OTHER PUBLICATIONS

KBA_BT_0201: Bluetooth advertising data basics; Silicon Laboratories; Feb. 10, 2017; Website available at: https://www.silabs.com/community/wireless/bluetooth/knowledge-base.entry.html/2017/02/10/bluetooth_advertisin-hGsf.

Abraham; Understanding Bluetooth Advertising Packets; Jun. 4, 2017; Website available at: http://j2abro.blogspot.com/2014/06/understanding-bluetooth-advertising.html?m=1.

Warne; Bluetooth Low Energy—It starts with Advertising; Feb. 15, 2017; Website available at: https://blog.bluetooth.com/bluetooth-low-energy-it-starts-with-advertising.

Lindh; Bluetooth® low energy Beacons; Texas Instruments Application Report; Jan. 2015; Available at: http://www.ti.com/lit/an/swra475a/swra475a.pdf.

* cited by examiner

SECURE SYSTEMS AND METHODS FOR ESTABLISHING WIRELESS AUDIO SHARING CONNECTION

BACKGROUND

The disclosure relates to wireless audio sharing systems and related devices and methods, and, particularly, to systems and methods for securely establishing a wireless audio sharing connection between two audio devices using an intermediary controlling device.

SUMMARY

All examples and features mentioned below can be combined in any technically possible way.

In one aspect, a method for tethering wireless audio devices includes establishing a first wireless connection between an intermediary device and a primary audio device; receiving a random resolvable address by the intermediary device from a secondary audio device; transmitting the random resolvable address to the primary audio device via the first wireless connection; transmitting an instruction to the primary audio device, via the first wireless connection, to analyze broadcasted data from nearby audio devices for a matching audio device having broadcasted data corresponding to the random resolvable address, and to initiate a second wireless connection with the matching audio device; and transmitting audio data to the primary audio device via the first wireless connection for streaming the audio data from the primary audio device to the secondary audio device, identified to the primary audio device as the matching audio device, via the second wireless connection.

Examples may include the intermediary device having a software application installed on the intermediary device, and wherein the software application is configured to perform one or more of the establishing, the receiving, or any of the transmitting steps.

Examples may include the intermediary device not directly connecting to the secondary audio device.

Examples may include the intermediary device not having an identity resolving key associated with the random resolvable address.

Examples may include receiving a Bluetooth Low Energy (BLE) advertising packet broadcasted by the secondary audio device, and the random resolvable address is included in the BLE advertising packet.

Examples may include the random resolvable address being included in a manufacturer specific data field of the BLE advertising packet.

Examples may include the second wireless connection arranged as a classic Bluetooth connection.

Examples may include the audio data streamed using the Bluetooth Advanced Audio Distribution Profile.

Examples may include the intermediary device arranged as a smartphone, a laptop, a tablet, or mobile computing device.

Examples may include the primary audio device and the secondary audio device arranged as at least one of a headset, headphones, a speaker, and earbuds.

In one aspect, a method for tethering audio devices includes establishing a first wireless connection between an intermediary device and a primary audio device; receiving a first advertising packet by the intermediary device from a secondary audio device, the advertising packet including a random resolvable address for the secondary audio device; communicating the random resolvable address to the primary audio device via the first wireless connection; receiving, by the primary audio device, a second advertising packet from each of one or more nearby audio devices; analyzing whether data in any second advertising packet matches the random resolvable address; identifying a matching audio device as one of the nearby audio devices having data in its second advertising packet that matches the random resolvable address; establishing a second wireless connection between the primary audio device and the matching audio device; transmitting audio data to the primary audio device via the first wireless connection; and streaming the audio data from the primary audio device to the secondary audio device, identified to the primary audio device as the matching audio device, via the second wireless connection.

Examples may include establishing the second wireless connection between the primary audio device and the matching audio device by: establishing a Bluetooth Low Energy (BLE) connection between the primary audio device and the matching audio device; initiating a BLE pairing between the primary audio device and the matching audio device; sending a static address identifying the matching audio device as the secondary audio device to the primary audio device once the BLE pairing is complete; establishing a Classic Bluetooth connection between the primary audio device and the secondary audio device using the static address; and disconnecting the BLE connection.

In one aspect, a wireless audio device tethering system includes an intermediary device having a wireless transceiver; wherein the intermediary device is configured to establish a first wireless connection with a primary audio device and to receive a random resolvable address publicly broadcast from a secondary audio device; wherein the intermediary device is further configured to transmit, to the primary audio device, audio data, the random resolvable address, and an instruction for the primary audio device to (i) analyze broadcasted data from nearby audio devices within communication range of the primary audio device for a matching audio device having broadcasted data corresponding to the random resolvable address and (ii) initiate a second wireless connection with the matching audio device, for streaming the audio data to the secondary audio device, identified to the primary audio device as the matching audio device, over the second wireless connection.

Examples may include the intermediary device having a software application installed on the intermediary device and the first wireless connection connects the application to the primary audio device.

Examples may include the intermediary device not directly connected to the secondary audio device.

Examples may include the intermediary device not having an identity resolving key associated with the random resolvable address.

Examples may include the random resolvable address received in a Bluetooth Low Energy (BLE) advertising packet broadcasted by the secondary audio device.

Examples may include the random resolvable address included in a manufacturer specific data field of the BLE advertising packet.

Examples may include the second wireless connection as a classic Bluetooth connection and the audio data is streamed using the Bluetooth Advanced Audio Distribution Profile.

Examples may include the intermediary device arranged as a smartphone, a laptop, a tablet, or mobile computing device and wherein the primary audio device and the secondary audio device comprise at least one of a headset, headphones, a speaker, and earbuds.

In another aspect, a wireless audio device tethering system may include an intermediary device having a first wireless transceiver; a primary audio device having a second wireless transceiver configured to establish a first wireless connection by the intermediary device; wherein the intermediary device is configured to receive a random resolvable address from a secondary audio device and to transmit audio data and the random resolvable address to the primary audio device via the first wireless connection; wherein the primary audio device is configured to analyze broadcasted data from local audio devices within communication range of the primary audio device for a matching audio device having broadcasted data corresponding to the random resolvable address, and to initiate a second wireless connection with the secondary audio device, identified to the primary audio device as the matching audio device, for streaming the audio data to the secondary audio device over the second wireless connection.

DETAILED DESCRIPTION

The present disclosure describes various systems and methods for securely establishing a wireless audio sharing connection between two audio devices using an intermediary controlling device.

Wireless audio systems have been developed that enable a smartphone or other audio source to simultaneously share the same audio data with multiple audio devices (such as headphones, speakers, eyeglasses or other wearable audio devices). For example, a primary audio device (or "master") may stream or forward the audio data to a secondary audio device (or "slave"). These systems often rely on a software application installed on the smartphone (or other audio source) that obtains the classic Bluetooth address of the secondary audio device, which is passed to the primary audio device so that the primary audio device can identify the secondary audio device and initiate a classic Bluetooth connection. For example, legacy Bluetooth-enabled devices may use a static Bluetooth Low Energy (BLE) address (that never changes and is same as the classic Bluetooth address) that can be extracted from a broadcasting audio device's BLE advertising packet without the need for BLE pairing to the secondary audio device. However, there may be privacy concerns with respect to publicly broadcasting a static address, as static addresses enable the location of a particular device (and by extension, the owner of the device) to be tracked over time, e.g., by malicious third party BLE scanners.

The audio devices in the examples disclosed herein are configured to utilize and broadcast random resolvable addresses. A "random resolvable address" (which may also be referred to as a "resolvable private address") as used herein includes any dynamically changing identifier, e.g., string of dynamically changing characters, that prevents the audio device broadcasting its random resolvable address from being uniquely identified unless the entity attempting the identification has a corresponding identity resolving key (IRK). The random resolvable address may also be generated from the IRK.

While the use of random resolvable addresses alleviate privacy concerns, they also complicate the ability of connectivity and control software applications for the audio devices, e.g., installed on a smartphone or other intermediary device, to identify the audio devices for audio sharing via device tethering. This is particularly of note in situations in which it is not desirable or feasible to pair the software application to each of the audio devices with which audio sharing is sought.

Wireless audio tethering systems and methods are also disclosed in U.S. Pat. No. 9,820,323, which patent is incorporated by reference herein in its entirety.

Figure 1:
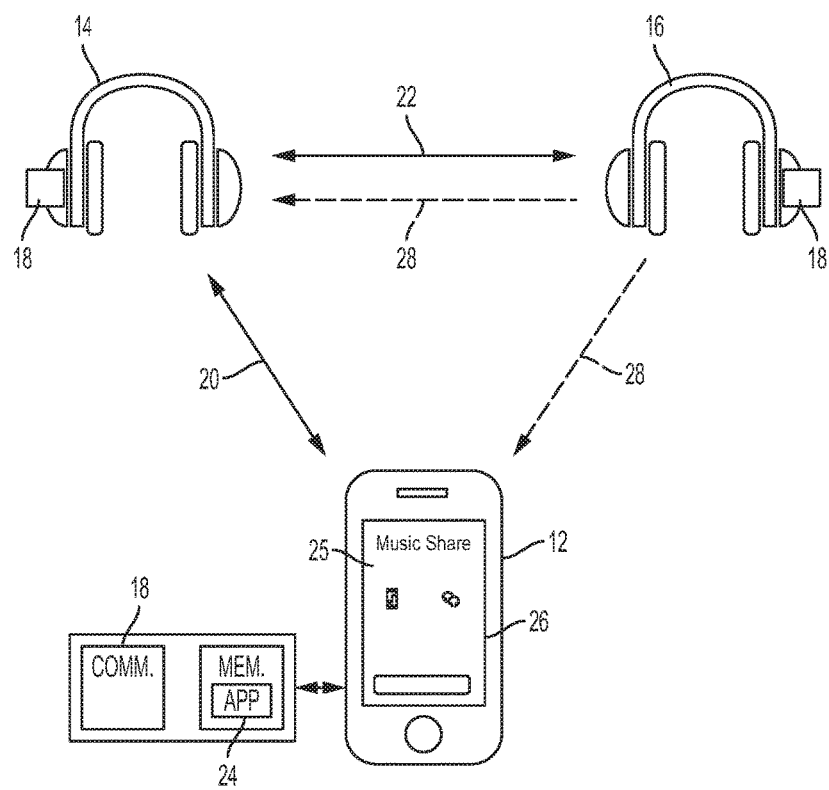
FIG. 1 schematically illustrates a wireless audio sharing system according to one example disclosed herein.

FIG. 1 depicts a wireless audio device tethering system 10 having an intermediary device 12 configured as an audio source for audio data sent to a primary audio device 14 and a secondary audio device 16. The primary and secondary audio devices 14 and 16 may include headphones (as shown in FIG. 1), headsets, earbuds, earpieces, speakers, eyeglasses, or any other device configured to produce sound from audio data. The intermediary device 12 may be or include any wireless-enabled audio source capable of transmitting audio data, such as a smartphone (as shown in FIG. 1), tablet, laptop, mobile computing device, etc. In accordance with tethering terminology, the primary audio device 14 may be referred to as a "master", while the secondary audio device 16 may be referred to as a "slave", since the secondary audio device 16 is configured to receive audio data streamed or forwarded from the primary audio device 14 (as opposed to directly from the intermediary device 12). As discussed in more detail below, this tethering relationship may be implemented by the intermediary device 12 according to the systems and methods disclosed herein without the need to directly connect or pair the intermediary device 12 and the secondary audio device 16 together and without the need for any device in the system 10 to publicly broadcast or share a static address (e.g., MAC address or similar), such as in a BLE advertising packet.

Each of the primary audio device 14, the secondary audio device 16, and the intermediary device 12 includes a communication module 18, which may each include one or more wireless transceivers configured to enable wireless communication. The communication modules 18 may include any hardware and/or software configured to enable communication according to any desired wireless protocol, standard, or technology. In one example, the communication modules 18 include radiofrequency antennas coupled with Bluetooth chipsets. By use of the communication modules 18, a first wireless connection 20 is established between the intermediary device 12 and the primary audio device 14, while a second wireless connection 22 is established between the primary audio device 14 and the secondary audio device 16.

The first wireless connection 20 and the second wireless connection 22 may include any desired type or combination of connections, such as any protocol or protocols according to BLE specifications for pairing the corresponding devices together. In addition to pairing the devices, audio data transmitted from the intermediary device 12 to the primary audio device 14 (via the first wireless connection 20) can be streamed or forwarded from the primary audio device 14 to the secondary audio device 16 (via the second wireless connection 22). In particular, an Advanced Audio Distribution Profile (A2DP) connection may be utilized for facilitating the transmitting or streaming of audio data.

The intermediary device 12 includes a software application 24, e.g., installed in memory of the intermediary device 12, that facilitates connection with, transmission to, and/or control of the audio devices 14 and 16 as described in more detail herein. In one example, the application 24 is the Bose® Connect application. Since the application 24 is installed on the intermediary device 12, it is to be appreciated that functionality, operational steps, etc. attributed to the intermediary device 12 may generally include use of the application 24, and that functionality, operational steps, etc., attributed to the application 24 may be carried out by physical components of the intermediary device 12. For example, the wireless connection 20 may include an application layer connection for the application 24 to communicate with the primary audio device 14, such as via any desired mobile application protocol applicable over a BLE connection. Further, the various different protocols, channels, technologies, etc. used by the wireless connection 20 may all be initiated by the application 24, or established by the same physical layer components, e.g., the communication module 18 of the intermediary device 12.

The application 24 may be configured to generate a graphical user interface (GUI) 25 on a display unit 26 of the intermediary device 12. The display unit 26 may include a capacitive touchscreen or be in communication with a pointing device, keyboard, etc. for enabling user input to the application 24 via the GUI 25. As discussed in more detail below, user input via the GUI 25 enables the user to selectively establish or disconnect the wireless connections 20 and 22 and to set the audio data that is transmitted to the audio device 14 and streamed to the secondary audio device 16 (e.g., to select a media file, radio station, or other source of audio data) among other functions.

BLE pairing of the intermediary device 12 and the secondary device 16 is not always desired. For example, under certain operating systems, such as Apple® iOS, a pairing prompt for a BLE pairing will appear in the application 24 on the intermediary device 12 that may incorrectly give users the impression that the intermediary device 12 is connecting via classic Bluetooth to the secondary audio device 16. BLE pairing with the secondary audio device 16 may also result in the secondary audio device 16 being added to the paired device list (PDL) of the intermediary device 12. This may be undesirable for users that want to share audio with a friend or other user's audio device a single time or on a case-by-case basis.

Instead of directly connecting (e.g., Bluetooth pairing) the intermediary device 12 to the secondary audio device 16, the secondary audio device 16 may be arranged to transmit a BLE advertisement (or other data receivable by devices within communication range) via a public broadcast 28. Although not illustrated, the primary audio device 14, as a BLE-enabled device, may be similarly configured to broadcast BLE advertising packets. As discussed in more detail below, the information contained in the broadcast 28 can be used to enable the intermediary device 12 and the primary audio device 14 to both commonly identify the secondary audio device 16, thereby enabling the second wireless connection 22 to be established based on instructions from the intermediary device 12.

Figure 2:
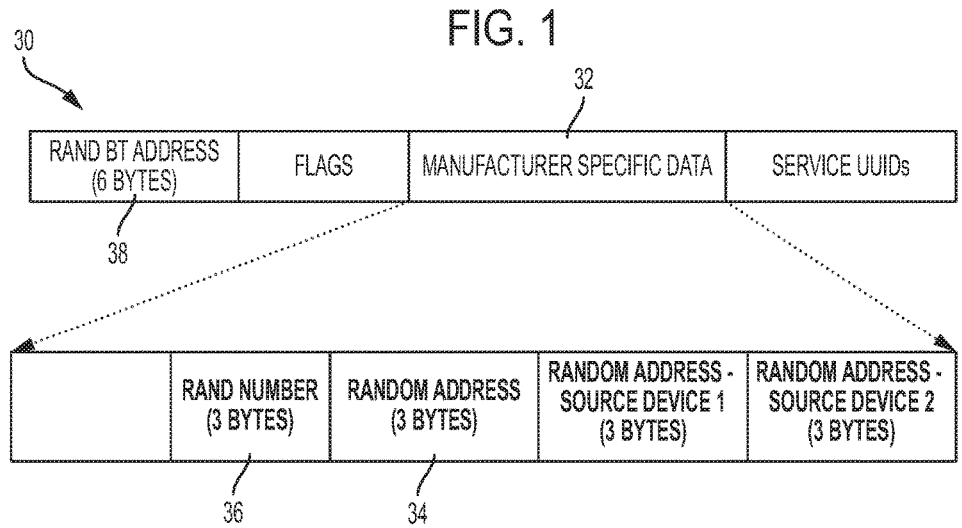
FIG. 2 is illustrates an advertising packet according to one example disclosed herein.

According to examples disclosed herein, each audio device is configured to obtain and insert a random resolvable address in its broadcasted data, such as its BLE advertising packets. An example of a BLE advertising packet 30 is illustrated in FIG. 2, which may be transmitted as, or as part of, the broadcast 28. In FIG. 2 the BLE advertising packet 30 includes a manufacturer specific data field 32 that includes a random resolvable address 34. The random resolvable address, such as the random resolvable address 34, may be generated by each audio device itself, e.g., during runtime, by a server or manufacturing equipment as part of the manufacturing process or initial setup for the audio device, or in any other manner.

As shown in FIG. 2, the random resolvable address 34 may be generated from a random number 36 also stored in the data field 32. In this example, the random resolvable address includes six bytes of data, with the first three bytes arranged as the random number 36, which may be refreshed on a periodic basis (e.g., every fifteen minutes or other selected time period). In one example, the three-byte random number is padded and encrypted, e.g., via to any encryption technique or methodology, such as Advanced Encryption Standard (AES). In one example, AES-128 is utilized using a 128-bit identity resolving key to produce the second half (remaining three bytes) of the random resolvable address 34. Those of ordinary skill in the art will appreciate other techniques and standards that can be used to create a random resolvable address.

It is noted that the BLE advertising packet 30 may also include a Bluetooth address field 38 that contains a random resolvable address that is assigned per standard BLE protocols. Accordingly, the Bluetooth-assigned random resolvable address stored in the address field 38 may be utilized in some examples. However, despite being in a BLE advertising packet, the Bluetooth address field 38 is not always accessible. For example, software applications installed to certain operation systems, such as the Apple iOS operating system on Bluetooth-enabled devices, cannot always access the data in the address field 38. In view of such situations, the random resolvable address 34 in the manufacturer specific data field 32 may be utilized, thereby ensuring access by the intermediary device 12.

In addition to the random resolvable address, the manufacturer specific data field 32 of the advertising packet 30 may include generic identifying information for the audio devices. By "generic identifying information", it is meant information such as the make, model, or manufacturer of the broadcasting audio device, but not any uniquely identifying information (such as a globally unique identifier, MAC address, etc.). For example, the generic identifying information in the broadcast 28 may indicate that the secondary audio device 16 is a specific model of audio device made by a specific manufacturer (e.g., the QC25 headphones, SoundSport Free headphones, SoundLink Revolve speaker, etc., manufactured by Bose® Corporation). In this way, the generic identifying information cannot be used, e.g., by malicious third-party BLE scanners, to track the location of an audio device (and by extension, the owner of the audio device) over time.

The application 24 installed on the intermediary device 12 (e.g., the Bose® Connect application), may be configured to display, via the GUI 25, a text or graphical representation of each nearby broadcasting device based on the generic identifying information. While the generic identifying information is insufficient to track the audio devices over time, the user will have specific knowledge of the make, model, or other generic information of the secondary audio device 16 that enables the user to select the secondary audio device 16 from the generic list when audio sharing is desired. For example, if the user desires to share music or other audio with the headset of a friend, the user will know which headset belongs to the friend.

Once the user selects the desired nearby audio device to use as the secondary audio device 16, the application 24 can retrieve the random resolvable address as discussed above. Although the application 24 is not able to resolve the identity of the secondary audio device 16 from the random resolvable address, the random resolvable address, at any given moment, is essentially just a unique character string. In this way, the random resolvable address can be provided to the primary audio device 14 as an identifier for locating which nearby broadcasting audio device is the secondary audio device 16. That is, the primary audio device 14 may perform its own BLE scan and attempt to find a nearby broadcasting audio device that has data in the corresponding field of its BLE advertising packet that matches the random resolvable address. If the user properly selected the secondary audio device 16 from the generic identifying information noted above, then the matching audio device identified by the primary audio device 14 is the secondary audio device 16. In this way, both of the application 24 and the primary audio device 14 can identify the secondary audio device 16 from the random resolvable address, but without the need of the IRK for the random resolvable address, and without the need for the application 24 to directly connect to the secondary audio device 16.

Figure 3:
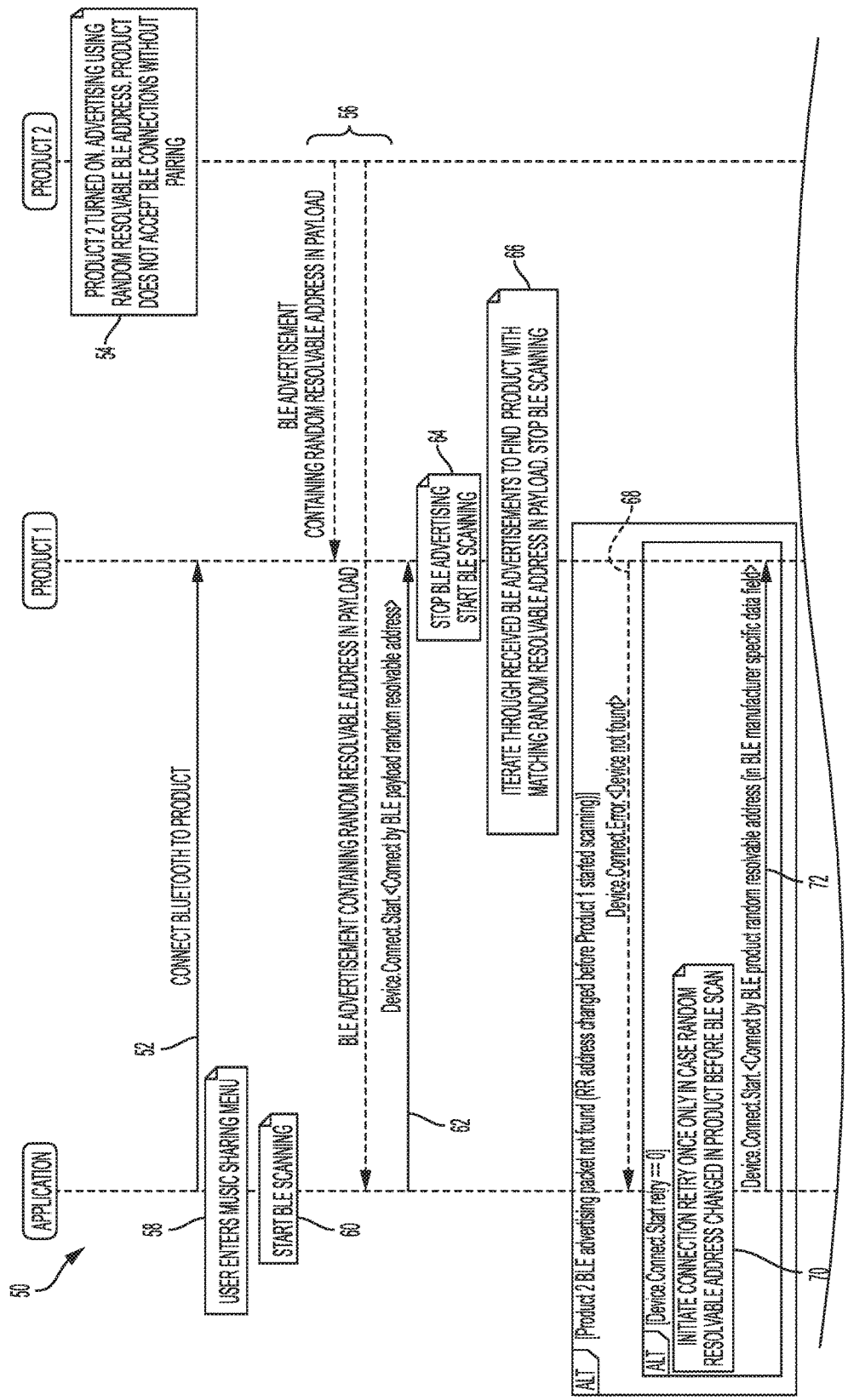
FIG. 3 illustrates a sequence diagram for operating a wireless audio sharing system, such as the system of FIG. 1, according to one example disclosed herein.
Figure 3:
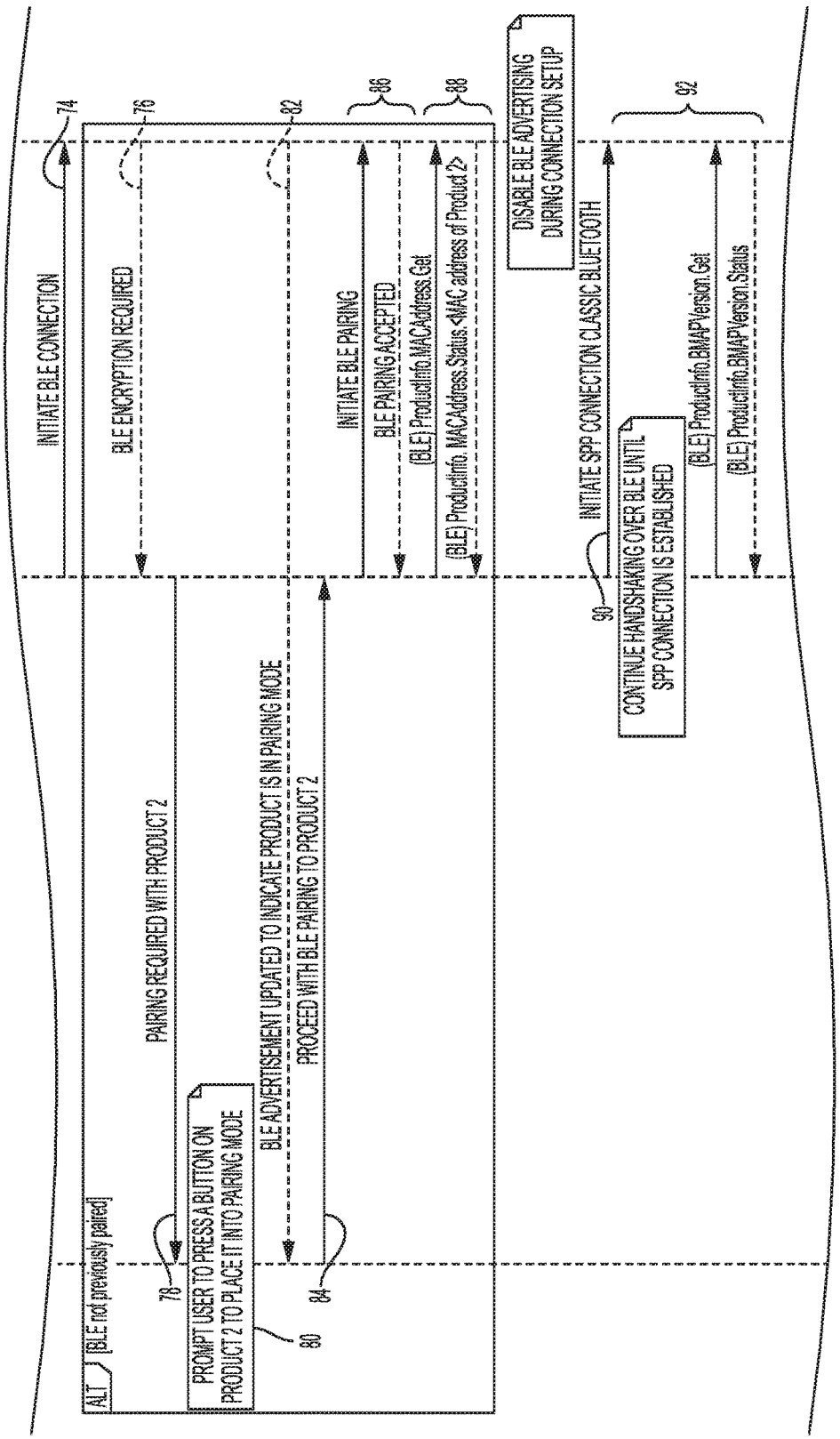
Figure 3:
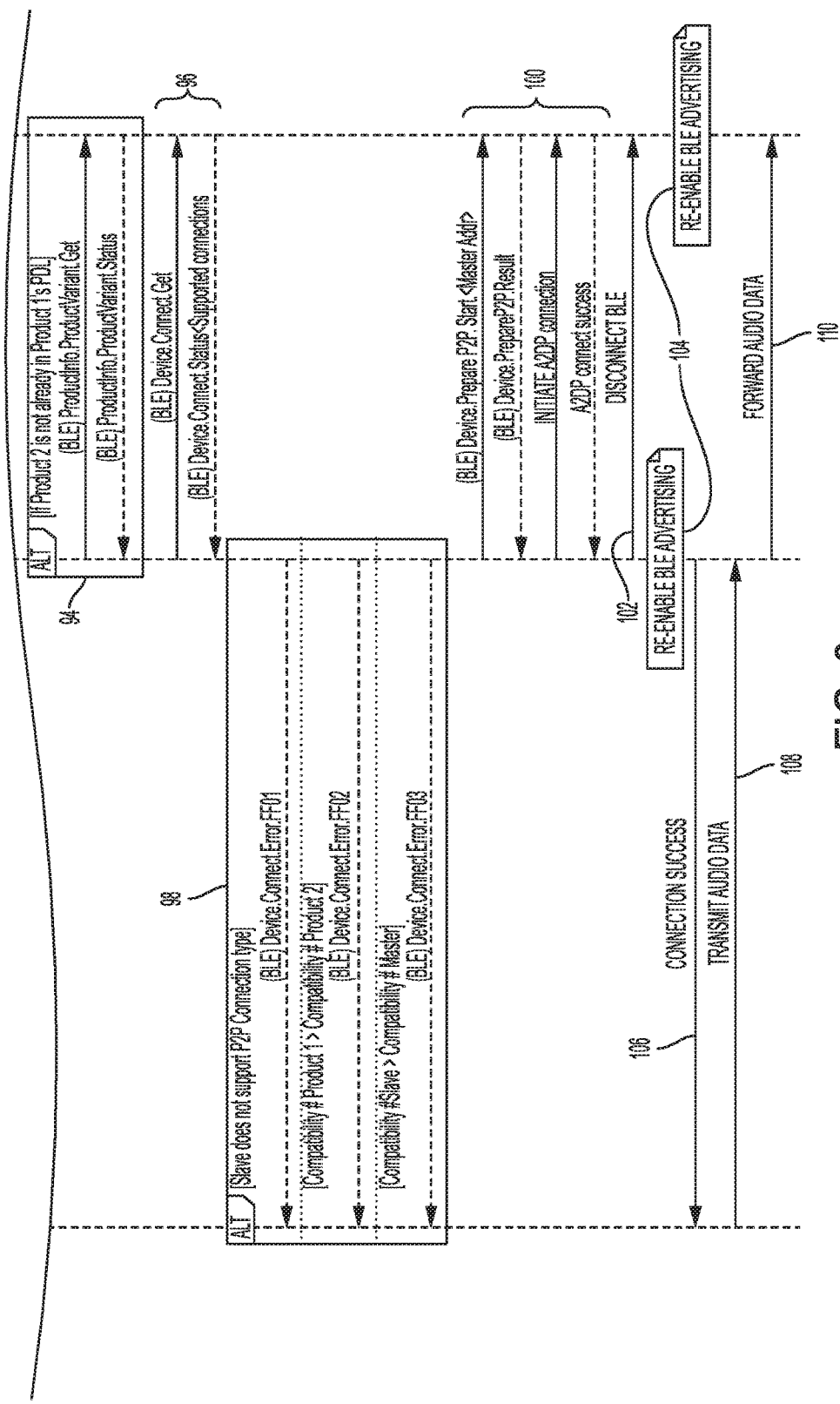

A method 50 of tethering wireless audio devices, such as via the system 10, can be appreciated in view of the sequence diagram of FIG. 3. It is to be appreciated that while the sequence diagram of FIG. 3 is described with respect to a specific example that employs communication via Bluetooth specifications, any other communication standard or protocol may be utilized in which devices are arranged to publicly broadcast or share a random resolvable address for the broadcasting device, as opposed to a static address (such as a MAC address). In the example of FIG. 3, a primary or master audio device is identified as "Product 1", while a secondary or slave audio device is identified as "Product 2". Thus, it is to be appreciated that the primary audio device 14 is generally interchangeable with "Product 1", while the secondary audio device 16 is generally interchangeable with "Product 2". It is to also noted that the application 24 and/or the intermediary device 12 are generally interchangeable with the "Application" in FIG. 3.

At step 52 in FIG. 3, a wireless connection between an application (e.g., the application 24 installed on the intermediary device 12) and a primary audio device (e.g., the primary audio device 14) is established (e.g., the wireless connection 20). The step 52 may include the application and the primary audio device being paired, e.g., in accordance with Bluetooth protocols. It is expected that in many instances the intermediary device, on which the application is installed, and the primary audio device will be owned by the same user and/or frequently used together, and thus, have already been paired or are desired to be paired by the user.

A secondary audio device (e.g., the secondary audio device 16) is turned on and/or set to a secure sharing mode in step 54 (e.g., via a software interface or physical switch or button). The secondary audio device may be configured with a random resolvable address (e.g., the random resolvable address 34), in its BLE advertising packet (e.g., the BLE advertising packet 30) as discussed above. The secondary audio device may be configured to refuse requested BLE connections without first undergoing pairing. The BLE advertising packet containing the random resolvable address is transmitted by the secondary audio device (e.g., via the broadcast 28), to both the application and the primary audio device at step 56.

At step 58, the user may initiate an audio data sharing function of the application, such as by entering a music sharing menu (e.g., via the GUI 25) of the application. At step 60, the application scans for the broadcasts of BLE-enabled audio devices in range. As a result, the application receives the broadcast transmitted by the secondary audio device in step 56. As discussed above, the application may extract generic identifying information from the data broadcasted in step 56, which enables the user (e.g., having specific knowledge of the desired secondary audio device) to select the secondary audio device from a list of nearby audio devices using only the generic identifying information.

In addition to generic identifying information, the application can extract the random resolvable address from the BLE advertising packets received in step 56. In accordance with the above disclosure, the random resolvable address extracted by the application may be the random resolvable address 34 stored in the manufacturer specific data field 32, the BLE-assigned random resolvable address from the address field 38, or a random resolvable address stored in another field.

The application may not have the IRK for the random resolvable address of the secondary audio device unless these devices are currently, or were previously, paired together. Regardless, the random resolvable address can be used to instruct the primary audio device to initiate a connection with the secondary audio device, even if the identity of the secondary audio device cannot be resolved. That is, once the random resolvable address for the secondary audio device has been extracted, the application at step 62 sends a command to the primary audio device instructing the primary audio device to identify and then initiate a connection with whichever device contains data in its advertising packet that matches the extracted random resolvable address.

In response to the instruction in step 62, the primary audio device may stop its own BLE advertising in step 64 and start scanning for nearby broadcasting audio devices. The primary audio device receives the broadcasted data from all nearby BLE-enabled devices, including the BLE advertising packets broadcast from the secondary audio device in step 56. At step 66 the primary audio device compares the random resolvable address received from application to the data in the corresponding fields of each received advertising packet until an audio device that has matching data is found.

The matching audio device can confidently be identified as the same device selected by the user in step 58. That is, even if neither the application nor the primary audio device can resolve the random resolvable address, the random resolvable address received by each device will be the same (e.g., a certain string of numbers) and can be compared in its unresolved form. Essentially, this enables both the application and the primary audio device at any given moment to confidently identify the same device, even if neither can actually resolve that device's identity. As a result, neither the application nor the primary audio device needs to know the static address of the secondary audio device, or even which nearby device the secondary audio device is. Instead, the primary audio device can be instructed to initiate a connection with whichever device was selected by the user in step 58 (which can be assumed to be the secondary audio device based on the specific knowledge of the user as discussed above).

In the event that the primary audio device in step 66 cannot find a matching audio device, it may send an error at step 68. For example, since the random resolvable address is dynamically changing (e.g., refreshing every few minutes) it is possible that the random resolvable address is changed in the time between the steps 58 and 66. As a result, the random resolvable address extracted by the application and sent to the primary audio device in this scenario would not be current when the primary audio device is performing the comparison in step 66. Upon receipt of the error, the application may repeat the step 60 and extract the random resolvable address from the most-recently received advertising packets at step 70. If the previously extracted random resolvable address does not match the newly extracted random resolvable address, the newly extracted random resolvable address can be sent to the primary audio device in step 72. The primary audio device 14 can then repeat the steps 64 and 66 as necessary to find the matching audio device.

Once the matching audio device is located, the primary audio device can initiate a BLE connection (e.g., the wireless connection 22) at step 74. If the user correctly selected the secondary audio device in step 58, then the matching audio device will be the secondary audio device. If the primary audio device 14 has not previously paired with the secondary audio device, then the secondary audio device may request BLE encryption at step 76, which request will be forwarded from the primary audio device 14 to the intermediary device 12 in step 78. The application may at a step 80 prompt the user to activate a pairing mode on the secondary audio device (e.g., to press a button, activate a software setting, etc.).

Once in the pairing mode, the advertising packets broadcast by the secondary audio device may be updated to indicate that the pairing mode is activated at step 82. At step 84, the application may instruct the primary audio device to proceed with pairing to the secondary audio device. The primary audio device initiates BLE pairing and the pairing is accepted by the secondary audio device at step 86. Once paired, the primary audio device can request and receive a static address of the secondary audio device at step 88. It is noted that once paired, the BLE connection is encrypted so the static address of the secondary audio device can be safely sent over a secure link to the primary audio device, e.g., without risk of interception by a third party scanner.

Once the static address for the secondary audio device is known (either obtained in step 94 or via a previous pairing), the primary audio device at step 90 may initiate a connection over classic Bluetooth protocols, e.g., a serial port profile (SPP) connection. BLE advertising may be disabled during set up of the connection. If necessary, a handshaking process to complete the connection may occur at step 92 in which the primary audio device requests and is provided with additional information, such as the version of any communication protocol used. If the secondary audio device is not already in the PDL of the primary audio device, additional information for completing the PDL entry may be requested and provided at step 94.

At step 96, the primary audio device may request the secondary audio device to identify whether the secondary audio device is compatible with a desired connection type. If the desired connection type is not supported, or if the primary audio device and the secondary audio device are using mismatched protocol versions, the primary audio device may send a corresponding error message to the application at step 98.

If the connection type and/or protocols are supported, then at a step 100 the primary audio device may prepare the secondary audio device for and then initiate and establish an audio data streaming connection, such as via A2DP. Once the audio data connection is established, the BLE pairing may be disconnected at step 102, and BLE advertising for the primary audio device and/or the secondary audio device at step 104. At step 106 the primary audio device can indicate to the application that the connection with the secondary audio device 16 was successful. At step 108 the application may transmit audio data to the primary audio device 14. Finally, the audio data is forwarded to the secondary audio device 16 at step 110. Thereafter, the application may simultaneously control audio data transmission to both the primary and the secondary audio devices. It is to be appreciated that this is advantageously accomplished without requiring the application to pair with the secondary audio device and without requiring any of the devices to broadcast a static address.

While several inventive examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive examples described herein. It is, therefore, to be understood that the foregoing examples are presented by way of example only and that, within the scope of the appended claims and equivalents thereto, inventive examples may be practiced otherwise than as specifically described and claimed. Inventive examples of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the inventive scope of the present disclosure.

The invention claimed is:

1. A method for tethering wireless audio devices, comprising:
    establishing a first wireless connection between an intermediary device and a primary audio device;
    receiving a random resolvable address by the intermediary device from a secondary audio device;
    transmitting the random resolvable address from the intermediary device to the primary audio device via the first wireless connection;
    transmitting an instruction to the primary audio device from the intermediary device, via the first wireless connection, to analyze broadcasted data from nearby audio devices for a matching audio device having broadcasted data corresponding to the random resolvable address, and to initiate a second wireless connection with the matching audio device; and
    transmitting audio data to the primary audio device from the intermediary device via the first wireless connection and streaming the audio data from the primary audio device to the secondary audio device, identified to the primary audio device as the matching audio device, via the second wireless connection.

2. The method of claim 1, wherein the intermediary device comprises a software application installed on the intermediary device, and wherein the software application is configured to perform one or more of the establishing, the receiving, or any of the transmitting steps.

3. The method of claim 1, wherein the intermediary device does not directly connect to the secondary audio device.

4. The method of claim 1, wherein the intermediary device does not have an identity resolving key associated with the random resolvable address.

5. The method of claim 1, wherein the receiving includes receiving a Bluetooth Low Energy (BLE) advertising packet broadcasted by the secondary audio device, and the random resolvable address is included in the BLE advertising packet.

6. The method of claim 5, wherein the random resolvable address is included in a manufacturer specific data field of the BLE advertising packet.

7. The method of claim 1, wherein the second wireless connection is a classic Bluetooth connection.

8. The method of claim 1, wherein the intermediary device comprises a smartphone, a laptop, a tablet, or mobile computing device.

9. The method of claim 1, wherein the primary audio device and the secondary audio device comprise at least one of a headset, headphones, a speaker, and earbuds.

10. A method for tethering audio devices, comprising:
    establishing a first wireless connection between an intermediary device and a primary audio device;
    receiving a first advertising packet by the intermediary device from a secondary audio device, the first advertising packet comprising a random resolvable address for the secondary audio device;
    communicating the random resolvable address to the primary audio device from the intermediary device via the first wireless connection;
    receiving, by the primary audio device, a second advertising packet from each of one or more nearby audio devices;
    analyzing, by the primary audio device, whether data in any second advertising packet matches the random resolvable address;
    identifying, by the primary audio device, a matching audio device as one of the nearby audio devices having data in its second advertising packet that matches the random resolvable address;
    establishing a second wireless connection between the primary audio device and the matching audio device;
    transmitting audio data to the primary audio device from the intermediary device via the first wireless connection; and
    streaming the audio data from the primary audio device to the secondary audio device, identified to the primary audio device as the matching audio device, via the second wireless connection.

11. The method of claim 10, wherein establishing the second wireless connection between the primary audio device and the matching audio device comprises:
    establishing a Bluetooth Low Energy (BLE) connection between the primary audio device and the matching audio device;
    initiating a BLE pairing between the primary audio device and the matching audio device;
    sending a static address identifying the matching audio device as the secondary audio device to the primary audio device once the BLE pairing is complete;
    establishing a Classic Bluetooth connection between the primary audio device and the secondary audio device using the static address; and
    disconnecting the BLE connection.

12. A wireless audio device tethering system comprising:
    an intermediary device having a wireless transceiver;
    wherein the intermediary device is configured to establish a first wireless connection with a primary audio device and to receive a random resolvable address publicly broadcast from a secondary audio device;
    wherein the intermediary device is further configured to transmit, to the primary audio device, audio data, the random resolvable address, and an instruction for the primary audio device to (i) analyze broadcasted data from nearby audio devices within communication range of the primary audio device for a matching audio device having broadcasted data corresponding to the random resolvable address and (ii) initiate a second wireless connection with the matching audio device, for streaming the audio data to the secondary audio device, identified to the primary audio device as the matching audio device, over the second wireless connection.

13. The system of claim 12, wherein the intermediary device comprises a software application installed on the intermediary device and the first wireless connection connects the software application to the primary audio device.

14. The system of claim 12, wherein the intermediary device is not directly connected to the secondary audio device.

15. The system of claim 12, wherein the intermediary device does not have an identity resolving key associated with the random resolvable address.

16. The system of claim 12, wherein the random resolvable address is received in a Bluetooth Low Energy (BLE) advertising packet broadcasted by the secondary audio device.

17. The system of claim 16, wherein the random resolvable address is included in a manufacturer specific data field of the BLE advertising packet.

18. The system of claim 12, wherein the intermediary device comprises a smartphone, a laptop, a tablet, or mobile computing device and wherein the primary audio device and the secondary audio device comprise at least one of a headset, headphones, a speaker, and earbuds.

19. A wireless audio device tethering system comprising:
    an intermediary device having a first wireless transceiver;
    a primary audio device having a second wireless transceiver configured to establish a first wireless connection by the intermediary device;
    wherein the intermediary device is configured to receive a random resolvable address from a secondary audio device and to transmit audio data and the random resolvable address to the primary audio device via the first wireless connection;
    wherein the primary audio device is configured to analyze broadcasted data from local audio devices within communication range of the primary audio device for a matching audio device having broadcasted data corresponding to the random resolvable address, and to initiate a second wireless connection with the secondary audio device, identified to the primary audio device as the matching audio device, for streaming the audio data to the secondary audio device over the second wireless connection.

20. The wireless audio device of claim 19, wherein the primary audio device is configured to establish the second wireless connection between the primary audio device and the matching audio device by:

establishing a Bluetooth Low Energy (BLE) connection between the primary audio device and the matching audio device;
initiating a BLE pairing between the primary audio device and the matching audio device;
sending a static address identifying the matching audio device as the secondary audio device to the primary audio device once the BLE pairing is complete;
establishing a Classic Bluetooth connection between the primary audio device and the secondary audio device using the static address; and
disconnecting the BLE connection.

* * * * *